US010421608B2

(12) United States Patent
Tan

(10) Patent No.: US 10,421,608 B2
(45) Date of Patent: Sep. 24, 2019

(54) FRAME STRUCTURE FOR A MULTI-LEVEL CONTAINER HANDLING AND STORAGE FACILITY

(71) Applicants: SH COGENT LOGISTICS PTE LTD, Singapore (SG); Yeow Khoon Tan, Singapore (SG)

(72) Inventor: Yeow Khoon Tan, Singapore (SG)

(73) Assignee: SH COGENT LOGISTICS PTE LTD, Singapore (SG)

( * ) Notice: Subject to any disclaimer, the term of this patent is extended or adjusted under 35 U.S.C. 154(b) by 150 days.

(21) Appl. No.: 14/780,507

(22) PCT Filed: Mar. 27, 2013

(86) PCT No.: PCT/SG2013/000120
§ 371 (c)(1),
(2) Date: Sep. 25, 2015

(87) PCT Pub. No.: WO2014/158090
PCT Pub. Date: Oct. 2, 2014

(65) Prior Publication Data
US 2016/0060034 A1 Mar. 3, 2016

(51) Int. Cl.
*B65G 63/04* (2006.01)
*B65G 1/04* (2006.01)
(Continued)

(52) U.S. Cl.
CPC ............. *B65G 1/0464* (2013.01); *B65G 1/14* (2013.01); *B65G 63/004* (2013.01); *B65G 63/04* (2013.01); *B65G 63/045* (2013.01)

(58) Field of Classification Search
CPC .......... B65G 1/0464; B65G 1/14; B65G 1/16; B65G 63/004; B65G 63/045; B66C 17/20; B66C 19/002
See application file for complete search history.

(56) References Cited

U.S. PATENT DOCUMENTS 2,440,307 A * 4/1948 Smith ................... B63B 25/004
114/72
3,608,750 A 9/1971 Young et al.
(Continued)

FOREIGN PATENT DOCUMENTS

DE 102009017241 * 10/2010 ........... B65G 1/0464
DE 102009051800 * 5/2011 ........... B65G 1/0464
(Continued)

OTHER PUBLICATIONS

International Search Report, dated Jun. 19, 2013 for corresponding International Application No. PCT/SG2013/000120.
(Continued)

*Primary Examiner* — James Keenan
(74) *Attorney, Agent, or Firm* — Intellectual Property Law Group LLP

(57) ABSTRACT

A frame structure for a multi-level container handling and storage facility 11, which is constructed by an array of basic structures comprising of two rows, R1 and R2, of spaced support columns 21 which are weight bearing. The columns in row R1 are joined respectively by one horizontal beam 25 and similarly the columns in row R2 are joined respectively by a separate horizontal beam 25 to form spaced adjacent beams that now define an intermediate level IL. The rows R1 and R2 of spaced support columns 21 are spaced at a distance allowing storage of at least one container therebetween below the intermediate level IL. The spaced adjacent horizontal beams 25 are at a distance matching the dimension of a container allowing storage of at least one container thereon above the intermediate level IL.

24 Claims, 9 Drawing Sheets

(51) Int. Cl.
*B65G 1/14* (2006.01)
*B65G 63/00* (2006.01)

(56) References Cited

U.S. PATENT DOCUMENTS

| | | | |
|---|---|---|---|
| 3,934,741 A | 1/1976 | Wentz | |
| 5,511,923 A | 4/1996 | Dunstan | |
| 5,707,199 A | 1/1998 | Faller | |
| 2008/0075569 A1* | 3/2008 | Benedict | B65G 1/0464 414/269 |
| 2010/0189534 A1* | 7/2010 | Jung | B65G 63/004 414/281 |

FOREIGN PATENT DOCUMENTS

| | | |
|---|---|---|
| WO | WO 2008/099996 A1 | 8/2008 |
| WO | WO 2011/150956 A1 | 12/2011 |

OTHER PUBLICATIONS

Written Opinion of the ISA, dated Jun. 19, 2013 for corresponding International Application No. PCT/SG2013/000120.
Written Opinion of the IPEA, dated Apr. 9, 2015 for corresponding International Application No. PCT/SG2013/000120.
International Preliminary Report on Patentability completion date Aug. 6, 2015 for corresponding International Application No. PCT/SG2013/000120.

* cited by examiner

FIG.2b
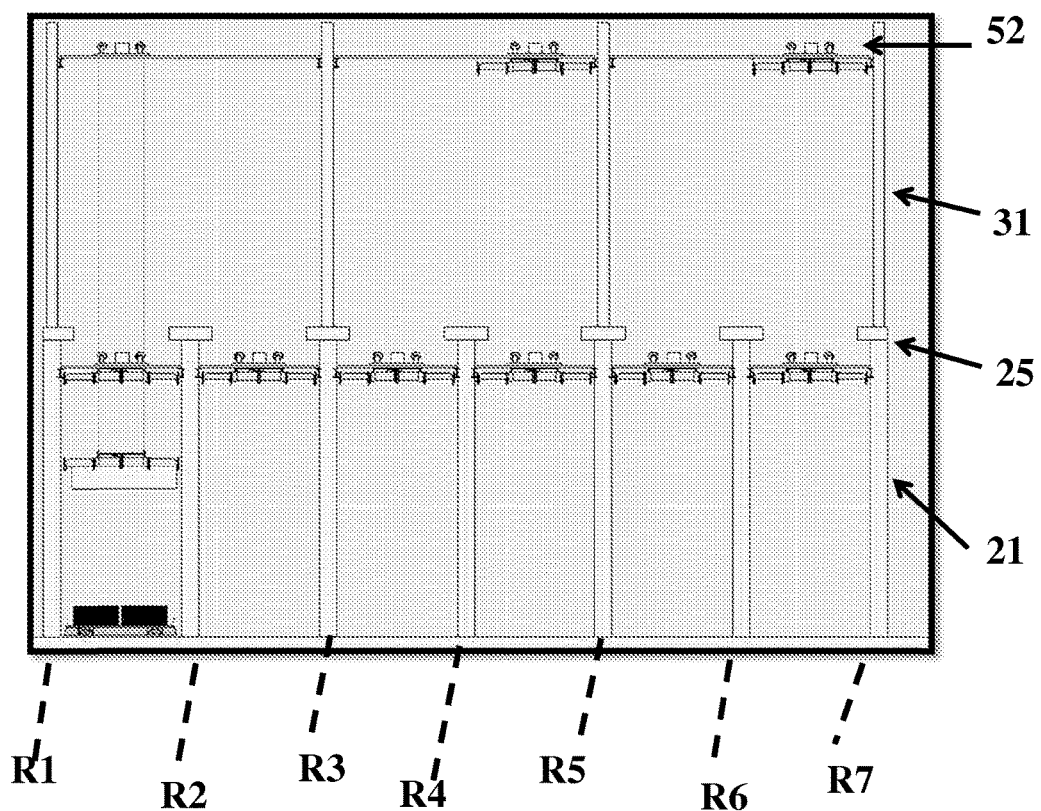
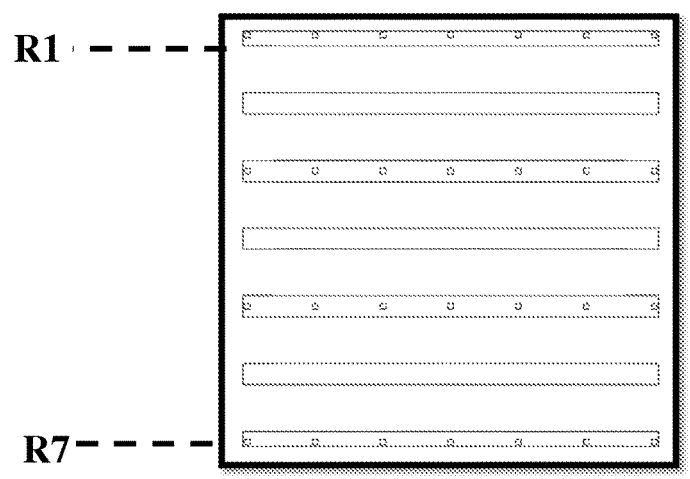
FIG.2c

FIG.3b
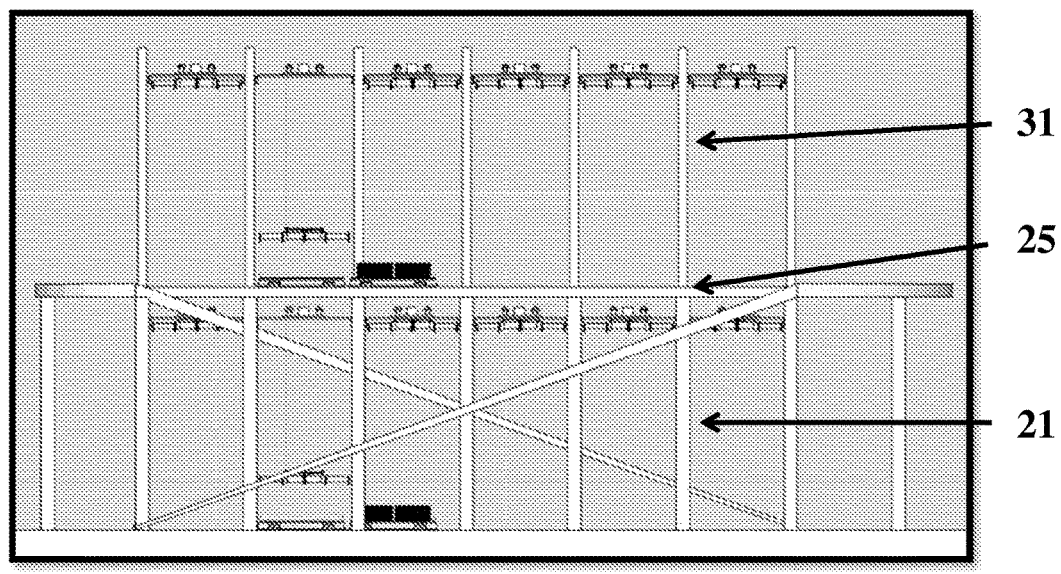
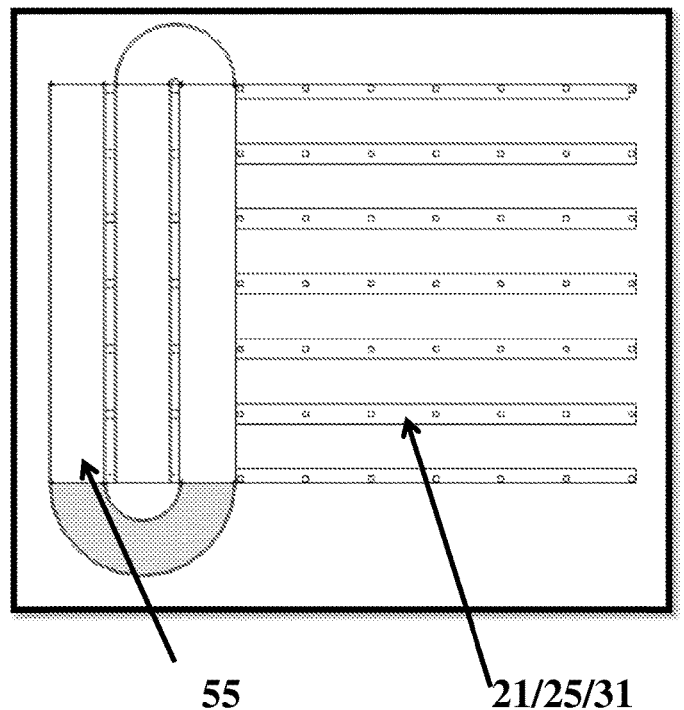
FIG.3c

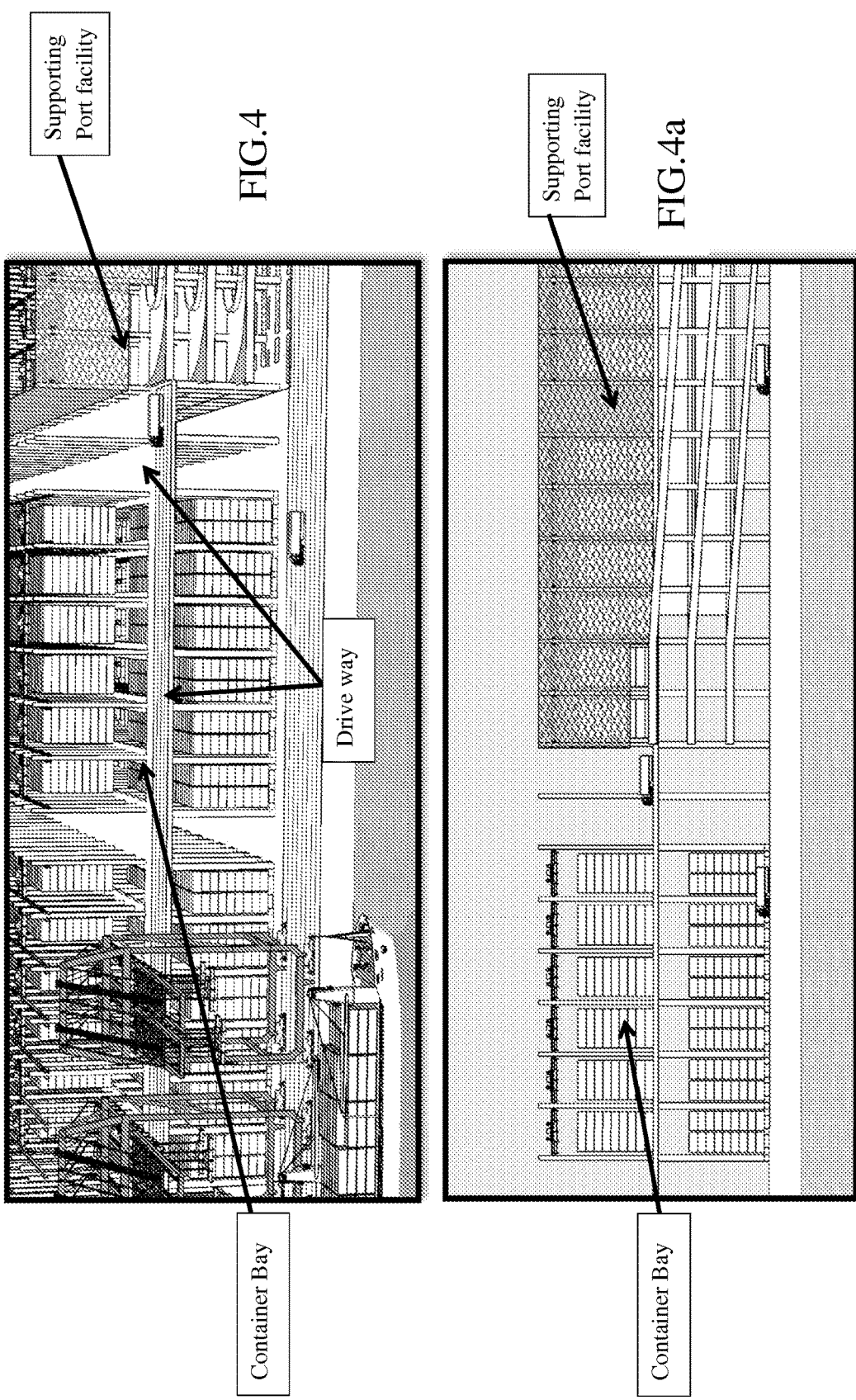

FRAME STRUCTURE FOR A MULTI-LEVEL CONTAINER HANDLING AND STORAGE FACILITY

FIELD OF INVENTION

The invention relates to a structure design that maximises land usage for the storage of containers in the shipping industry.

PRIOR ART

Containerization is an inter-modal system for the transportation of goods, which has become an integral part of the logistics supply chain with 90% of the non-bulk cargo moving via shipping containers or intermodal containers (herein after referred as "containers"). With greater dependence on containerization for higher efficiency and economies of scale, it leads to an increase in movements of containers all around the world. This increase in movements of containers results in a higher demand for land space to store these huge metal boxes, laden (with goods) or empty (without goods), in container terminals, warehouses as well as inland container depots around the world.

These containers can be in various dimensions depending on its user, and its capacity is measured by a common unit Twenty-Equivalent-Unit (TEU). A TEU refers to a standard 20 foot container measuring 20 feet (6.1 m) long and 8 feet (2.44 m) wide with standard container height of 8 foot 6 inches (2.59 m) and high cube container height of 9 foot 6 inches (2.90 m).

In present day, containers in a terminal or inland container depot are stored in an open yard stacked one on top of the other up to 9-high. These container storage facilities take up large areas of land due to the massive size of the containers as well as the container handling equipment. Therefore this poses a huge problem for the construction and expansion of ports or container storage facilities in places where land is scarce or where there are land constraints, including within the port's vicinity.

There have been various prior arts such as US005511923A, which maximizes the usage of the land for container storage. US005511923A teaches a multi-level facility with an ASRS system (Automated Storage and Retrieval System) for containers. In this facility, containers are stored within a covered building, with each container stored in individual framed container storage spaces. This facility also incorporates balconies with transporter moving along the balconies to facilitate the flow of containers in to the ASRS container racking.

Although the mentioned prior art is able to increase storage space and selectivity of containers through the use of a ASRS container racking system, the construction of the design involves multiple cells for individual containers which could be tedious as well as costly.

SUMMARY OF THE INVENTION

The objective of the framed design of the structure is to effectively use the airspace of a given area to achieve an increase in storage capacity of containers within the same given area with a simple design and thus lower construction cost.

The invention can provide a frame structure for a multi-level container handling and storage facility comprising: at least two rows of spaced supports of respective horizontal beams at an intermediate level; wherein the supports are spaced at a distance allowing storage of at least one container therebetween below the intermediate level; and wherein the adjacent horizontal beams are spaced at a distance in accordance with a dimension of a container allowing storage of at least one container thereon above the intermediate level.

In accordance with one form of the invention there is provided a frame structure for a multi-level container handling and storage facility, constructed by an array of basic structures comprising of: at least two rows of spaced support columns, with the columns in each row joined by at least one horizontal beam to form spaced adjacent beams at an intermediate level; wherein the spaced support columns are spaced at a distance allowing storage of at least one container therebetween below the intermediate level; and wherein the spaced adjacent beams are spaced at a distance matching the dimension of a container allowing storage of at least one container thereon above the intermediate level.

A frame structure can include at least two rows of spaced location columns extending above the intermediate level, wherein the spaced support columns are spaced at a distance allowing storage of at least one container therebetween above the intermediate level;

Preferably the support columns and location columns substantially linearly align.

In one form the front elevation of the intersection of beam and column forms a cross-shape.

Preferably a frame structure includes at least two intermediate levels vertically adjacent, allowing storage of at least one container between the vertically adjacent intermediate levels. The two intermediate levels vertically adjacent can be formed by support columns below the intermediate level forming load bearing of the spaced apart beams and location columns above the intermediate levels forming location means of the containers above the intermediate level.

The intermediate level can be dimensioned relative to the number of containers that can be supported on each other.

The stacking height of containers on each intermediate level is configured to any desired height in line with the maximum loading weight of the column and beam designed.

In use at least the four corner castings of the supported container are in contact with and supported by the beams.

Preferably the columns within each row are spaced at a distance proportional to the desired number of container stack.

A frame structure can have at least one overhead bridge crane (OHBC) between each row of columns at each intermediate level to allow transport of containers below each respective intermediate level.

Preferably at least one overhead bridge crane (OHBC) is between each rows of support columns or location columns at each intermediate level to allow transport of containers below each respective intermediate level and below a vertically adjacent intermediate level therebelow. Only selected rows of pairs of location columns need be erected on the highest level forming multiple rows of containers on three or more spaced apart beams and an OHBC extends across a plurality of rows of containers between the selected rows of pairs of location columns. Preferably the OHBC runway is integrated within 2 rows of columns at equal height. At least one OHBC can be integrated on the OHBC runway between two rows of columns at or adjacent each intermediate level.

In one form of a frame structure the runway of the Overhead Bridge Crane (OHBC) on upper levels are extended longer than the lower level sufficient for the transfer of containers between the upper levels and the ground floor.

Also containers stored in at least one of the intermediate levels can be accessible by preferable addition of at least one ramp.

A frame structure can be an independent structure. The structure can be integrated with another building, such as a warehouse or container terminal.

The structure can be further expanded to include driveways to accommodate quay side operations (transfer of containers from ship to shore or vice versa) and to accommodate quay to yard transfer.

A frame structure can be designed to be open air, covered roof or partially covered with the capability to accommodate applications such as solar panels.

Also the invention can provide a method of handling and storing a plurality of containers in a storage facility including the steps of:
a. Providing at least two linear parallel spaced support beams at an intermediate level dimensioned relative to the number of containers that can be supported on each other;
b. Storing a plurality of containers up to their support weight between the spaced support beams below the intermediate level
c. Storing a plurality of containers up to their support weight on the spaced support beams above the intermediate level;
d. Providing at least one access and transport means to allow selective movement of stored containers.

The method can have the at least one access and transport means is an OHBC mounted above the number of containers that can be supported on each other.

Preferably the at least one access and transport means is a ramp wherein containers stored in at least one of the intermediate levels is accessible by at least the ramp.

Preferably the runways of the Overhead Bridge Crane (OHBC) on upper levels are extended longer than the lower level sufficient for the transfer of containers between the upper levels and the ground floor.

The at least one OHBC can be integrated on the OHBC runway between two rows of columns at or adjacent each intermediate level.

The invention further provides a method of forming a handling and storage facility for a plurality of containers including the steps of:

The invention further provides a method of forming a handling and storage facility for a plurality of containers including the steps of:
a) providing at least at least two rows of spaced support columns, with the columns in each row joined by at least one horizontal beam to form spaced adjacent beams at an intermediate level, wherein the spaced support columns are spaced at a distance allowing storage of at least one container therebetween below the intermediate level, and wherein the spaced adjacent beams are spaced at a distance matching the dimension of a container allowing storage of at least one container thereon above the intermediate level;
b) providing at least two rows of spaced location columns extending above the intermediate level, wherein the spaced location columns are spaced at a distance allowing storage of at least one container therebetween above the intermediate level;
c) mounting at least one overhead bridge crane (OHBC) in between each rows of support columns or location columns at each intermediate level to allow transport of containers below each respective intermediate level and below a vertically adjacent intermediate level therebelow.

The method of forming a handling and storage facility for a plurality of containers can further include the steps of providing at least one ramp to an intermediate level wherein containers stored in at least one of the intermediate levels are accessible by the at least one ramp.

A typical container can be seen to be made of a cuboid metal frame wrapped with a layer of metal sheet with every corner of the container fitted with a container fitting (herein referred to as corner casting). The said corner casting elevates the container slightly such that the metal sheet on the base of the container is a minute distance away from the ground. Therefore, in actual fact, the entire weight of the container is actually supported by the vertical support members of the container. In other words, the weight of a container is transferred to the four corner castings.

Considering the fact that only the base corner castings are supporting the entire weight of the container, having two parallel beams in contact with at least the four corner castings of the container is very much sufficient to support rows of stacked containers one on top of another. Therefore in the construction of at least an upper level for storage of containers, floor slab can be replaced by horizontal beams (herein referred to as beams).

This invention offers a simple and economically practical method not seen in prior art that utilize airspace for container storage and handling. The potential and advantages of the design will be illustrated in various embodiments in the detailed description provided below.

BRIEF DESCRIPTION OF THE DRAWINGS

In order that the invention is more readily understood embodiments will be described by way of illustration only wherein:

FIG. 2b is the front elevation of the second embodiment of FIG. 2;

FIG. 2c is the top view of the second embodiment of FIG. 2;

FIG. 3b is the front elevation of the third embodiment of FIG. 3 with ramp access;

FIG. 3c is the top view of the third embodiment of FIG. 3 with ramp access;

FIG. 4 is a perspective of a frame structure integrating with a port facility;

FIG. 4a is a side elevation of FIG. 4;

DETAILED DESCRIPTION OF THE DRAWINGS

Figure 1:
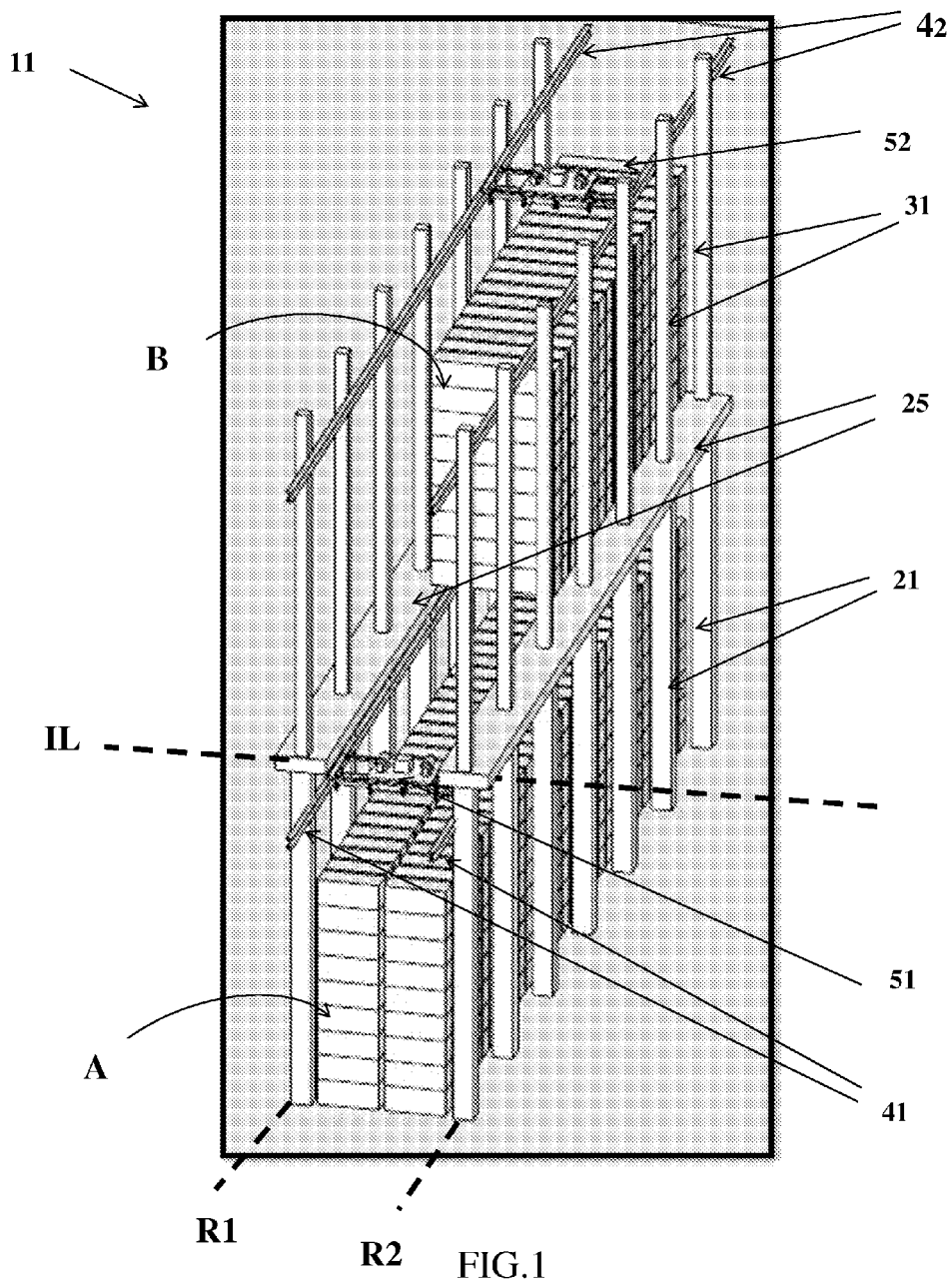
FIG. 1 is the side elevation of a first embodiment of the basic structure of a frame structure for a multi-level container handling and storage facility in accordance with the invention.

It should be noted in the following description that like or the same reference numerals in different embodiments denote the same or similar features.

The invention relates to a frame structure 11 design for a container handling and storage facility. It can be applicable to storage facility with at least one upper level positioned on a ground level. The said facility can be open air, covered with a roof or partially covered such as with solar panels.

Referring in particular to FIG. 1, in one embodiment the invention provides a frame structure for a multi-level container handling and storage facility 11, which is constructed by an array of basic structures comprising of two rows, R1 and R2, of spaced support columns 21 which are weight bearing. The columns in row R1 are joined respectively by one horizontal beam 25 and similarly the columns in row R2 are joined respectively by a separate horizontal beam 25 to form spaced adjacent beams that now define an intermediate level IL.

The rows R1 and R2 of spaced support columns 21 are spaced at a distance allowing storage of at least one container therebetween below the intermediate level IL. In particular there is a block of containers A that are readily stored therebetween. This stack A comprises containers stored upon each other.

However the spaced adjacent horizontal beams 25 are spaced at a distance matching the dimension of a container allowing storage of at least one container thereon above the intermediate level IL. In particular a second block of containers B can be stored in the airspace above the first block A even though the containers stored in A have reached the maximum height of stacking on each other.

A frame structure in this embodiment further includes at least two rows of spaced location columns 31 extending from the horizontal beams 25 above the intermediate level IL. The spaced location columns are spaced in rows substantially corresponding to R1 and R2 at a distance allowing storage of at least one container therebetween on the horizontal beams 25 above the intermediate level IL and thereby allowing the second block of containers B to be stored in the airspace above the first block of containers A.

Therefore it can be seen that a frame structure is made up of an array of basic structures. The said basic structure, shown in FIG. 1, is made up of 2 rows of vertical supports (herein referred to as "columns") with at least two columns per row. Columns in each row are joined to each other by at least one beam for structural integrity. The said beam can be positioned at any height along the column depending on the desired container stacking height. From the front elevation, the support columns 21, the location columns 31 and the horizontal beams 25 form a cross-shaped silhouette.

The space between each column in a row can be customized to the number of container stacks desired. The distance between the rows of columns is such that at least the four corner castings of the base container on each level are resting on the horizontal beams 25.

The basic structure also includes an Overhead Bridge Crane (herein referred to as OHBC) 51 and 52 on respective runways 41, 42 runway mounted on the inner side between 2 rows of columns providing at least one OHBC for the handling of containers on each level above or below the intermediate level IL. The lower runway 41 are two spaced horizontal rails mounted on the inner side of the rows of support columns 21 just below the intermediate level and thereby support the first OHBC 51 to allow movement of the containers in stack A. The upper runway 42 are two spaced horizontal rails mounted on the inner side of the rows of location columns 31 that only need to be sufficiently substantial to support the upper OHBC 52. The mounting of the upper runway 42 is near an upper end of the location columns 31 to thereby support the second OHBC 52 above the stack B and to allow movement of the containers in stack B.

Figure 1A:
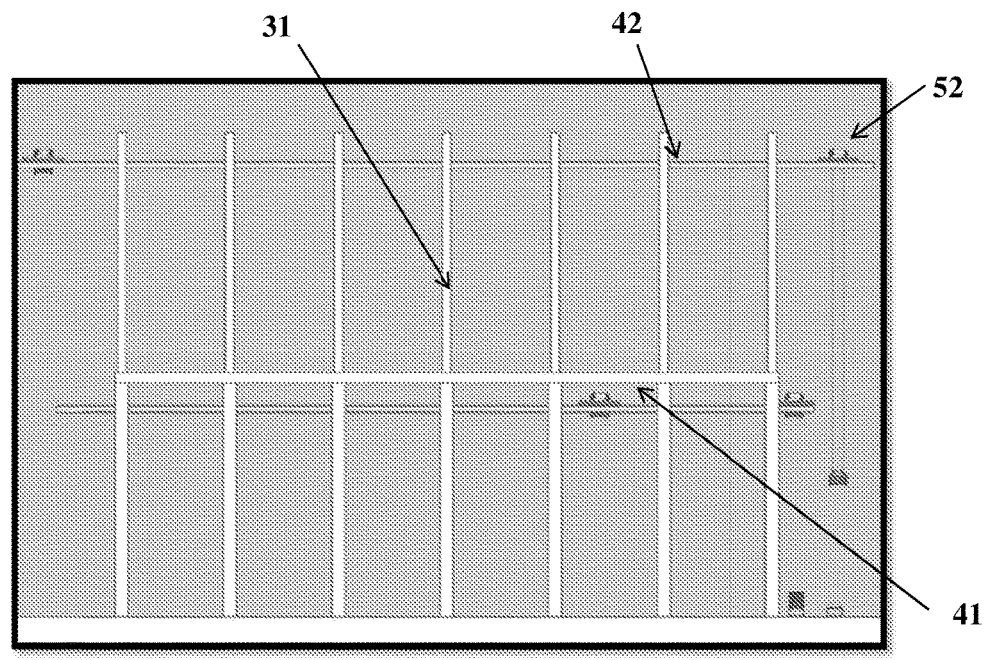
FIG. 1a is a front elevation of the first embodiment of FIG. 1.
Figure 1B:
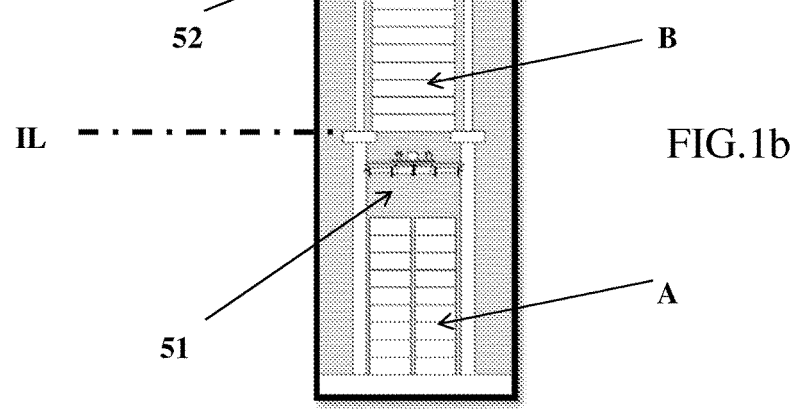
FIG. 1b is a side elevation of the first embodiment of FIG. 1.
Figure 1C:
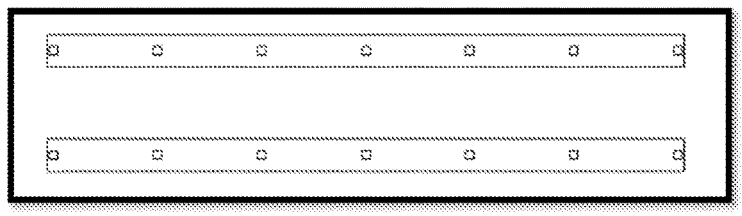
FIG. 1c is top view of the first embodiment of FIG. 1.

The basic structure as shown in FIG. 1 and the particular views of FIGS. 1a, 1b, and 1c can be expanded upwards or sideways as shown in the other embodiments. The said basic structure can be duplicated upwards to form a third level (see FIG. 5) or fourth level with each intermediate level able to withstand up to 9-high stacking of laden containers. In other embodiments, stacking height can be configured to any desired height in line with the maximum loading weight of the column designed. This differs from prior art US005511923A, which uses an individual container racking system.

Figure 2:
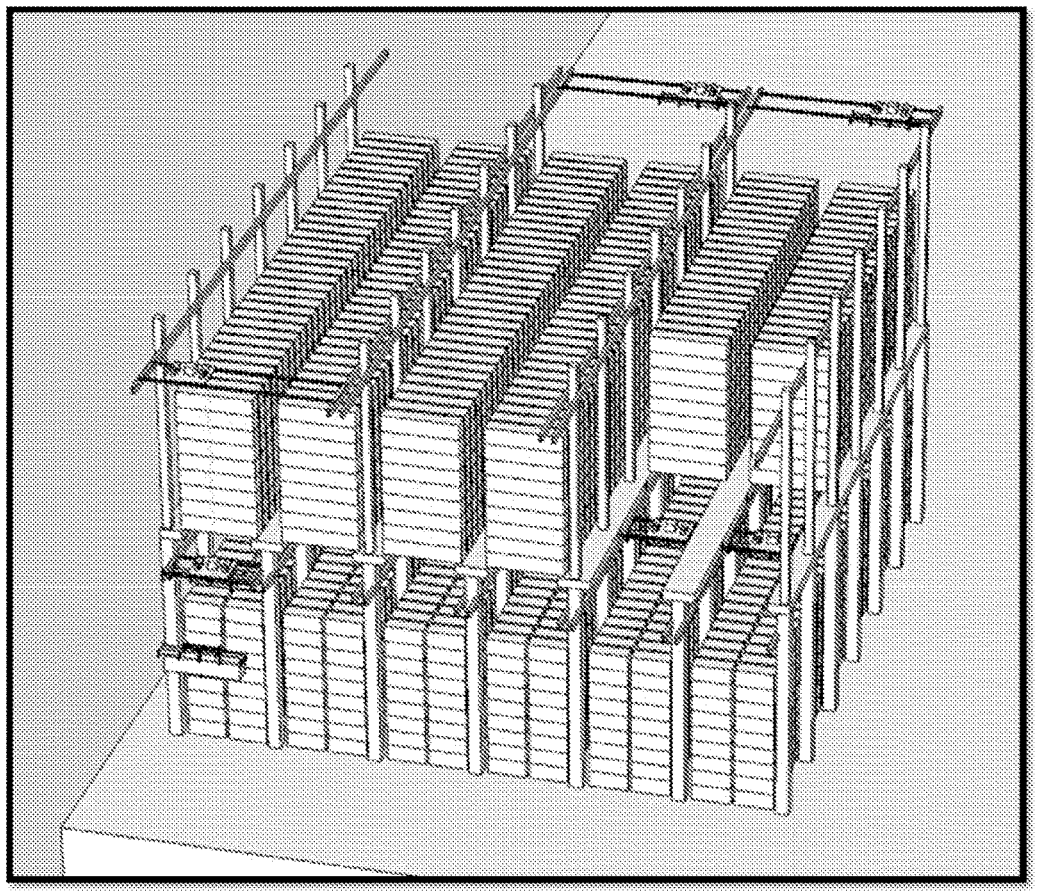
FIG. 2 is an expansion of the basic structure a first embodiment of the basic structure of a frame structure for a multi-level container handling and storage facility in accordance with the invention.
Figure 2A:
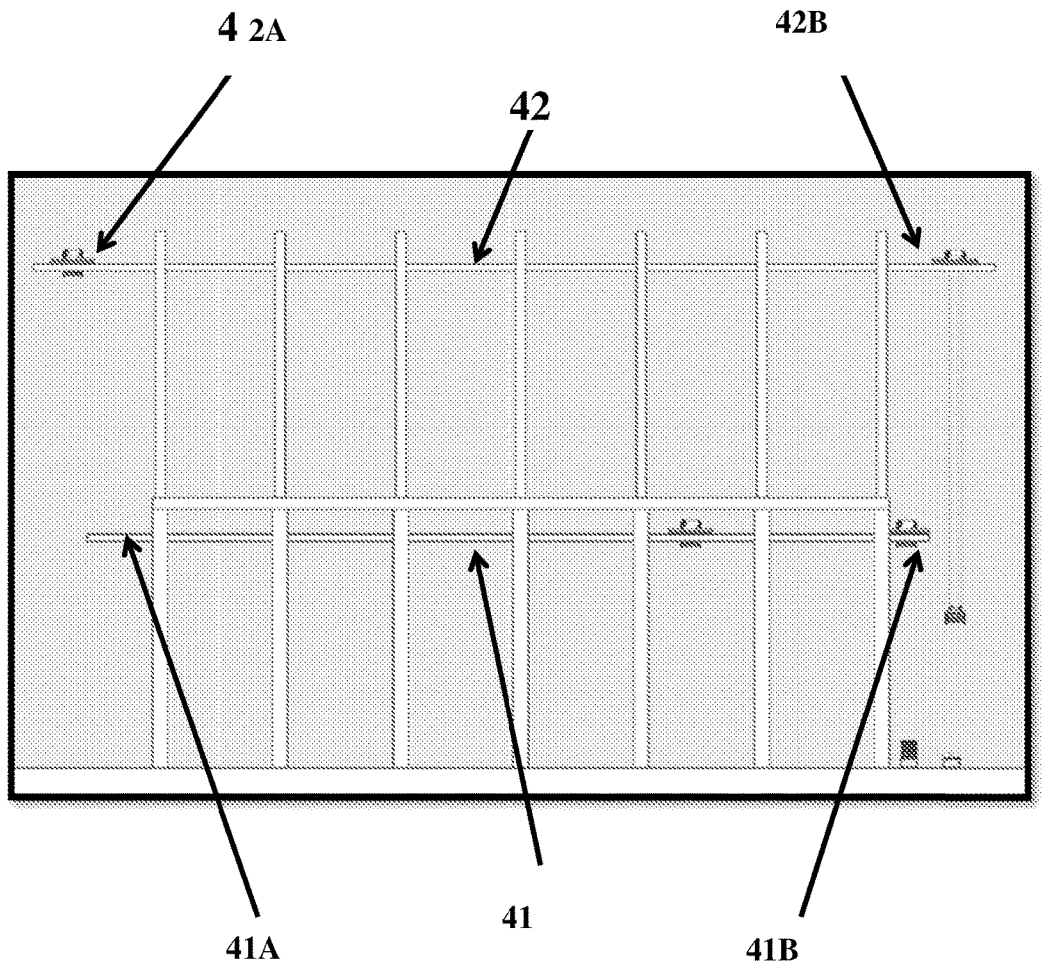
FIG. 2a is the side elevation of the second embodiment of FIG. 2.

In a particular second embodiment, shown in FIG. 2, and the particular views of FIGS. 2a, 2b, and 2c the basic structure can be expanded sideways by adding additional rows of columns to the existing structure. With particular reference to FIG. 2b there are seven parallel rows R1 to R7 of spaced support columns 21 on the ground and each having respective horizontal beam 25 and upper end to form the continuous intermediate level IL. Each of these rows are spaced so each can have a stack of containers A. A lower OHBC 51 can be mounted between each row just below the intermediate level IL to allow movement of the containers in stack A.

The upper horizontal beams are spaced so that they can support an upper stack of containers B between each row R1 to R7. Therefore between each rows R1 to R7 there are a stack of containers A below the intermediate level IL and a stack of containers B in the airspace above.

However as location beams 31 need only support the upper OHBC 52 that allows movement of the containers in stack B. it is not necessary for location columns to be on every row. Instead they can support an OHBC that works across two upper stacks of containers B and therefore only need location beams to be located on rows R1, R3, R5 and R7 in this embodiment. Other variations can occur.

For structural integrity to the design, bracings such as tie-beams or wired ropes can be integrated between columns. The said methods or materials for the tie back of the columns can be positioned at any preferred height on each intermediate level. In addition, to further enhance the aesthetic of the structure design, screens can be installed between the outer columns which also act to shield off any wind force that might jeopardize the stacks of containers.

Figure 3:
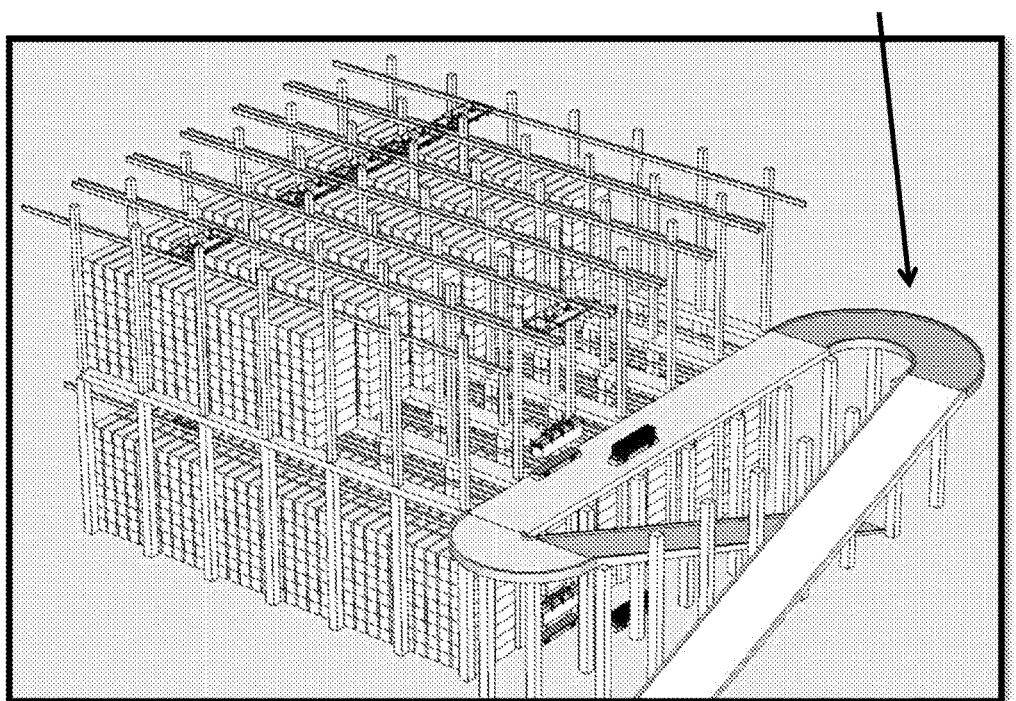
FIG. 3 is an elevation of a third embodiment of a frame structure for a multi-level container handling and storage facility in accordance with the invention with ramp access.
Figure 3A:
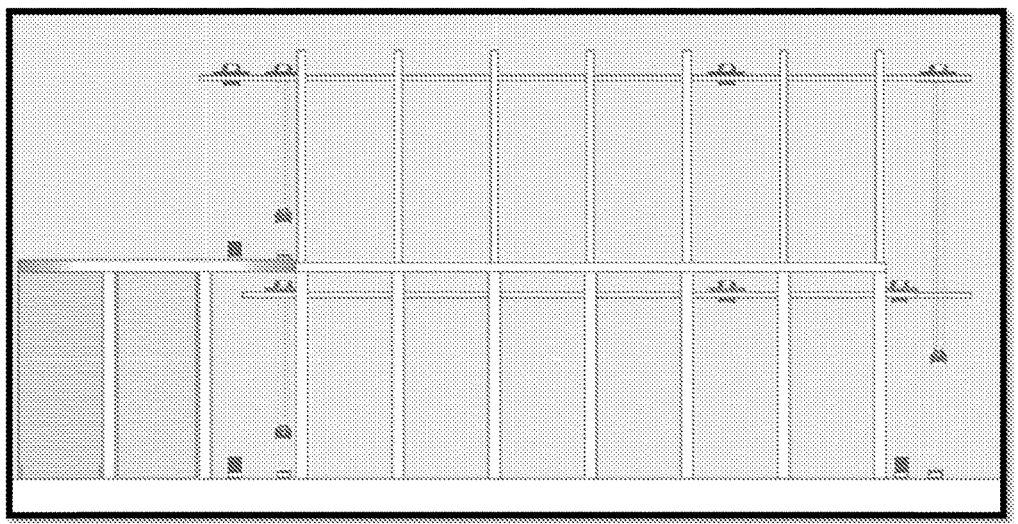
FIG. 3a is a side elevation of the third embodiment of FIG. 3 with ramp access.

With reference to FIG. 1a, 2a and 3a it can be seen that in preferred embodiments the runway 42 that supports the upper overhead bridge cranes 52 can be designed such that the runway of on the upper level extends longer between its ends 42A and 42B than the length of the runway 41 between its ends 41A and 41B that supports the lower overhead bridge cranes 51 at a lower level. In this way, the containers on the upper level in stack B can be transported down to the ground level.

In particular as shown by FIG. 2b the upper OHBC 52 can operate between the spaced support beams 25 down into the area below the intermediate level IL. However as the containers in stack B above the IL are correspondingly sized to the spacing of the spaced support beams 25 they must travel along runway 42 to near end 42A or 42B beyond the end of the lower runway 41A or 41B before returning in order to progress containers from stack B above the IL to stack A below the IL or vice versa. However clearly the advantages of such system are substantial.

This frame structure can be further explored. In another preferred embodiment as shown in FIG. 3, and the particular views of FIGS. 3a, 3b, and 3c by the design incorporating a ramp 55 to the intermediate level IL of the container storage facility. The advantage to this design is that it provides an additional route for the loading and unloading of containers, and thus decreases the possible bottle neck due to insufficient loading and unloading area with increased storage space thereby increasing the throughput of the containers going in and out.

The above mentioned embodiments are applications of a frame structure as an independent structure that can be used in settings such as an inland container depot.

This frame structure can exist not only as an independent structure. It can also be integrated with an existing building such as a port facility in a container terminal setting as shown in FIG. 4 and 4a. In a container terminal, containers are stored in various sub-division areas known as container bays within a container storage yard. A frame structure can be adopted for each container bay as such the capacity of each container bay can be doubled.

Figure 5:
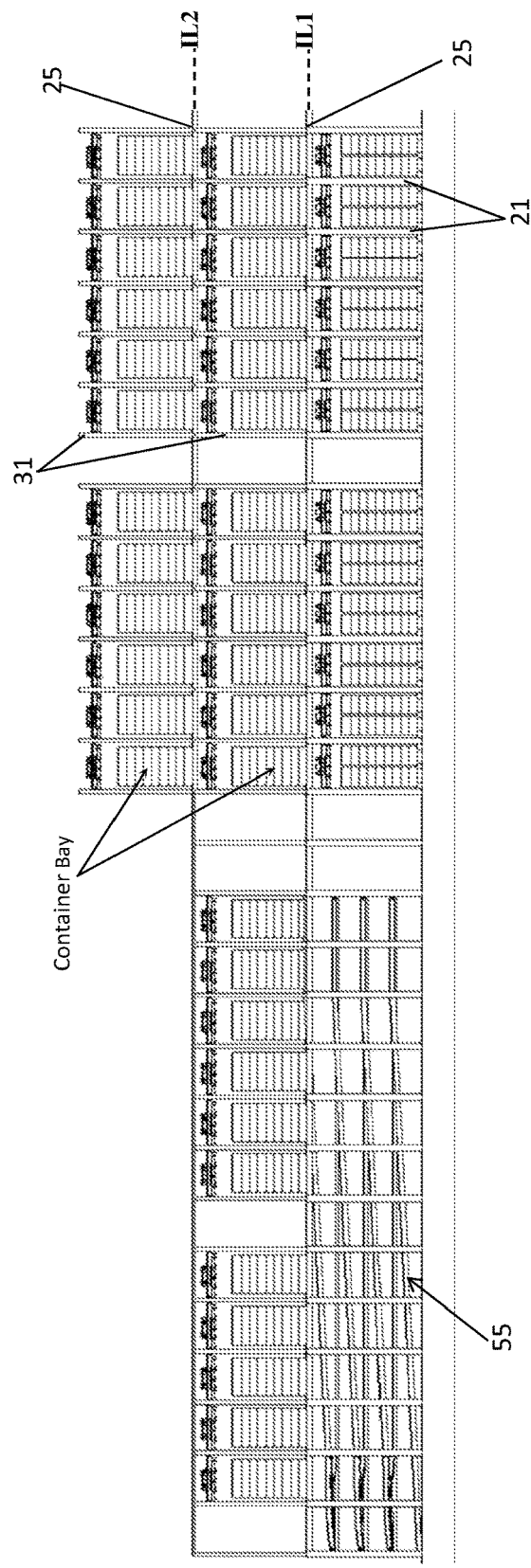
FIG. 5 illustrates a front elevation of a frame structure for a multi-level container handling and storage facility with ramp access, according to another embodiment of the present invention.

A frame structure of the container bay can be integrated into a port facility building with at least 2 storeys and an extended roof top. The said extended roof can be expanded as a driveway over the $2^{nd}$ level of the container storage yard such that vehicles can have access to the $2^{nd}$ level storage through the port facility building via ramp. As shown in FIG. 5, a multi-level container handling and storage facility with ramp 55 access is illustrated according to an embodiment of the present invention. As illustrated, the basic frame structure can be duplicated upwards to form a third level with two vertically adjacent intermediate levels IL1 (intermediate level) and IL2 (top intermediate level). The two vertically adjacent intermediate levels are formed by support columns 21 below each of the two vertically adjacent intermediate levels that are weight bearing of the spaced adjacent beams 25. The location columns 31 above the top vertically adjacent intermediate level IL2 form a space to store at least one container above the top vertically adjacent intermediate level.

The design mentioned above can be further expanded at the quay side to include a loading and unloading driveway on the $2^{nd}$ level of the storage yard for transfer of containers between ship and shore. This ship to shore loading and unloading driveway can be built such that it is able to utilize the back reach of the quay crane for quay side operation of containers between ship and shore.

It can be seen that embodiments are provided by A method of forming a handling and storage facility for a plurality of containers including the steps of: providing at least at least two rows of spaced support columns, with the columns in each row joined by at least one horizontal beam to form spaced adjacent beams at an intermediate level, wherein the spaced support columns are spaced at a distance allowing storage of at least one container therebetween below the intermediate level, and wherein the spaced adjacent beams are spaced at a distance matching the dimension of a container allowing storage of at least one container thereon above the intermediate level; providing at least two rows of spaced location columns extending above the intermediate level, wherein the spaced location columns are spaced at a distance allowing storage of at least one container therebetween above the intermediate level; mounting at least one overhead bridge crane (OHBC) in between each rows of support columns or location columns at each intermediate level to allow transport of containers below each respective intermediate level and below a vertically adjacent intermediate level therebelow.

At least one ramp can provide access to an intermediate level wherein containers stored in at least one of the intermediate levels are accessible by the at least one ramp.

A frame structure has various advantages, the most prominent being able to intensify the land usage by at least double. With its simple design, it enables less effort for its construction. It also saves on the material cost as compared to fully casted floor slabs. The penetrative nature of each level also reduces the need for Mechanical & Electrical (M&E) services, and increases ventilation between intermediate levels.
Embodiments:

While the preferred embodiments of the framed design structure have been discussed and illustrated, it should be understood that variations will be apparent to one skilled in the art. Accordingly, the framed design structure should not be limited to the embodiments disclosed in the drawings.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.
Different Instances of Objects As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", "horizontal" "vertical" and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope Of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the multi-level container handling and storage facility industries.

The invention claimed is:

1. A frame structure for a multi-level container handling and storage facility comprising:
at least two rows of spaced supports, the supports in each row joined by at least one horizontal beam to form spaced adjacent beams at an intermediate level;
wherein the at least two rows of supports are spaced at a distance allowing storage of at least one container between the rows of supports below the intermediate level;
and wherein the spaced adjacent beams are spaced at a distance in accordance with a dimension of a container allowing storage of at least one container thereon above the intermediate level;
at least two rows of spaced location columns extending above the intermediate level, wherein opposing spaced location columns in adjacent rows are spaced at a distance allowing storage of at least one container between the opposing spaced location columns in adjacent rows above the intermediate level;
at least one overhead container handling mechanism mounted in between each row of supports and in between each row of location columns to allow vertical and horizontal transport of containers below and above the intermediate level;
wherein in operation, at least two containers are stackable vertically on the adjacent beams at the intermediate level and below the intermediate level by each at least one overhead container handling mechanism.

2. The frame structure as claimed in claim 1 wherein the supports are formed by at least two rows of spaced support columns, with each adjacent column in a row joined by the at least one horizontal beam to form the spaced adjacent beams;
wherein the rows of support columns are spaced at a distance allowing storage of at least one container between the rows of support columns below the intermediate level;
and wherein the adjacent beams are spaced at a distance in accordance with a dimension of a container allowing storage of at least one container thereon above the intermediate level.

3. The frame structure as claimed in claim 2 wherein each support column and a respective location column substantially linearly align.

4. The frame structure as claimed in claim 1 including at least two vertically adjacent intermediate levels, allowing storage of at least one container between the vertically adjacent intermediate levels and allowing storage of at least one container above a top vertically adjacent intermediate level of the at least two vertically adjacent intermediate levels.

5. The frame structure as claimed in claim 4 wherein the at least two vertically adjacent intermediate levels are formed by support columns below each of the at least two vertically adjacent intermediate levels.

6. The frame structure as claimed in claim 1 wherein a stacking height of containers above the intermediate level is configured to allow storage of at least two containers.

7. The frame structure as claimed in claim 1 wherein a stacking height of containers on the intermediate level is configured to a height that the column and beam withstands based on a maximum loading weight of the column and beam.

8. The frame structure as claimed in claim 1 wherein at least four corner castings of a supported container are in contact with and supported by the beams.

9. The frame structure as claimed in claim 1 wherein the columns within each row are spaced at a distance allowing storage of at least one container.

10. The frame structure as claimed in claim 1 wherein bracings comprising tie-beams or wired ropes are connected between columns.

11. The frame structure as claimed in claim 1 wherein the at least one overhead container handling mechanism is an overhead bridge crane (OHBC).

12. The frame structure as claimed in claim 11 wherein rows of location columns define selected rows of location columns that are erected above only selected rows of spaced supports and extended above the intermediate level, thus forming a section between two selected rows of the location columns that allows storage of a plurality of rows of containers on three or more spaced apart beams, and the OHBC extends across the plurality of rows of containers between the two selected rows of location columns.

13. The frame structure as claimed in claim 11 wherein a pair of runways, upon which the OHBC runs, is integrated within two rows of columns at an equal height.

14. The frame structure as claimed in claim 11 wherein at least one OHBC is integrated on runways mounted between two rows of columns at or adjacent the intermediate level.

15. The frame structure as claimed in claim 11 wherein runways that support the OHBC are mounted between each row of location columns and are extended longer than runways mounted between each row of supports, for the transfer of containers between a level above the intermediate level and a ground floor.

16. The frame structure as claimed in claim 1 wherein containers stored in the intermediate level are accessible by way of at least one ramp.

17. The frame structure as claimed in claim 16 wherein the structure includes driveways to accommodate transfer of containers.

18. The frame structure as claimed in claim 1 wherein the structure is an independent structure.

19. The frame structure as claimed in claim 1 wherein the structure is integrated with another building.

20. A method of handling and storing a plurality of containers in a storage facility including the steps of:
 a. providing at least two linear parallel spaced support beams at an intermediate level, providing at least two rows of spaced support columns, with the support columns in each row joined by one of the at least two linear parallel spaced support beams, wherein the at least two rows of spaced support columns are spaced at a distance allowing storage of at least one container between the rows of spaced support columns below the intermediate level; and
 providing at least two rows of spaced location columns extending above the intermediate level, wherein opposing spaced location columns in adjacent rows are spaced at a distance allowing storage of at least one container between the opposing spaced location columns in adjacent rows above the intermediate level;
 b. storing a plurality of containers between the spaced support beams below the intermediate level;
 c. storing a plurality of containers on the spaced support beams above the intermediate level;
 d. providing at least one overhead container handling mechanism to allow vertical and horizontal transport of stored containers; wherein the at least one overhead container handling mechanism includes an overhead bridge crane (OHBC) mounted in between each row of supports and in between each row of location columns; and
 e. stacking the containers vertically by the overhead container handling mechanism on the spaced support beams above the intermediate level and stacking the containers below the intermediate level.

21. The method of handling and storing a plurality of containers in a storage facility as claimed in claim 20, wherein containers stored in at least one intermediate level are accessible by way of at least one access and transport means comprising a ramp.

22. The method of handling and storing a plurality of containers in a storage facility as claimed in claim 20, wherein the OHBC is integrated on a runways mounted between two rows of location columns at or adjacent the intermediate level and wherein runways mounted above the intermediate level are extended longer than runways mounted below the intermediate level, for the transfer of containers between locations above and below the intermediate level.

23. A method of forming a handling and storage facility for a plurality of containers including the steps of:
 providing at least two rows of spaced support columns, with the support columns in each row joined by at least one horizontal beam to form spaced adjacent beams at an intermediate level, wherein the at least two rows of spaced support columns are spaced at a distance allowing storage of at least one container between the rows of spaced support columns below the intermediate level, and wherein the spaced adjacent beams are spaced at a distance matching a dimension of a container allowing storage of at least one container thereon above the intermediate level;
 providing at least two rows of spaced location columns extending above the intermediate level, wherein opposing spaced location columns in adjacent rows are spaced at a distance allowing storage of at least one container between the opposing spaced location columns in adjacent rows above the intermediate level; and
 mounting at least one overhead bridge crane (OHBC) in between each row of support columns and between each row of location columns to allow transport of containers below and above the intermediate level.

24. The method of forming a handling and storage facility for a plurality of containers according to claim 23, further including the steps of providing at least one ramp to the intermediate level wherein containers stored in the intermediate level are accessible by way of the at least one ramp.

* * * * *